Figure 1:
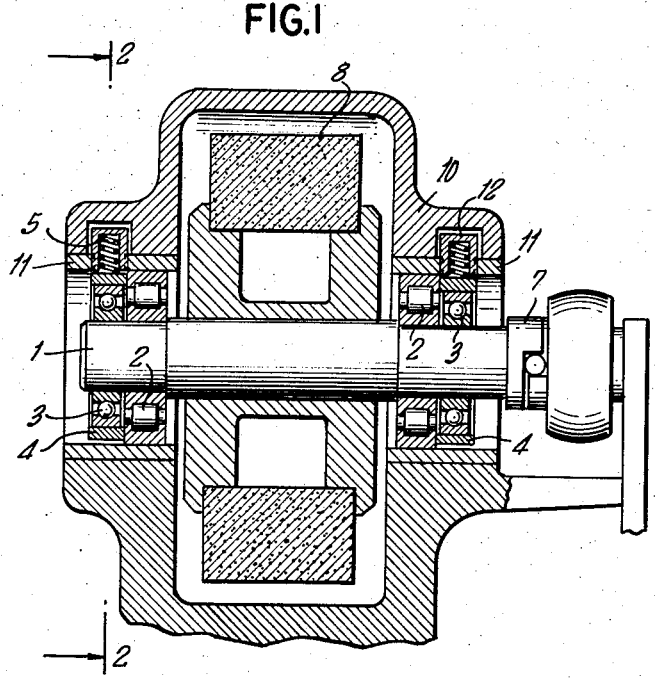

Oct. 20, 1959  H. WALKLING  2,909,014
TOOL-SPINDLE JOURNAL, PARTICULARLY IN
CENTERLESS GRINDING MACHINES
Filed Jan. 13, 1959

United States Patent Office 2,909,014
Patented Oct. 20, 1959

2,909,014

TOOL-SPINDLE JOURNAL, PARTICULARLY IN CENTERLESS GRINDING MACHINES

Helmuth Walkling, Aachen, Germany, assignor to Schumag Schumacher Metallwerke G.m.b.H., Aachen, Germany, a corporation of Germany Application January 13, 1959, Serial No. 786,583

Claims priority, application Germany January 16, 1958

4 Claims. (Cl. 51—168)

My invention relates to tool-spindle journalling means in machine tools, particularly grinding machines of the centerless type.

The machining and finishing of workpieces is often required to meet extremely exacting accuracy requirements, involving tolerances of but a few thousandths of one millimeter. For such a high degree of accuracy, the machine used for finishing the workpieces must run in their beds and bearings with a commensurate degree of precision, particular care being necessary with respect to the construction of the tool-spindle bearings.

The current tendency is toward ever increasing spindle speeds and hence to higher loads on the bearings. The resulting increase in wear affects the clearances and may cause vibrations of the spindle in its bearings. Such vibrations are most objectionable in finishing work where the desired precision depends on maintenance of dimensional accuracy.

Past proposals to compensate undesirable clearance in the spindle bearings by springs acting radially with respect to the spindle axis were unsatisfactory inasmuch as pressure applied in only one direction, or in two mutually perpendicular directions, failed to overcome the difficulty of reliably stabilizing the spindle in the precise working position.

It is an object of my invention to eliminate such shortcomings and to devise tool-spindle journalling means, especially in centerless grinding machines, that secure a precise and clearance-free journal of longer useful life and lesser maintenance requirements.

To this end, and in accordance with a feature of my invention, I provide the tool spindle or grinding-wheel spindle with two main bearings on opposite axial sides respectively of the tool, and also with two compensating bearings axially adjacent to the respective main bearings, each compensating bearing being embraced by a ring which is loaded by spring means acting radially toward the spindle axis. Each ring is loaded by two spring members spaced apart from each other by an angle of 120° in symmetrical relation to the point of contact between tool and workpiece, in such manner as to urge the tool spindle by means of the compensating bearings into its main bearings in the direction away from the workpiece. Under normal conditions of wear, tool spindles such as the spindles of grinding wheels, are thus made capable of running without clearance in a precisely stabilized position of the spindle axis.

Figure 2:
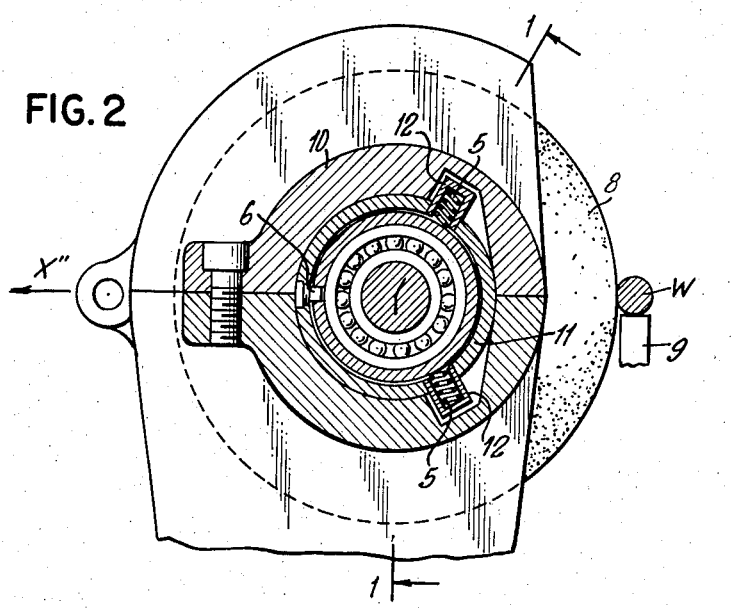

The foregoing and more specific features of the invention will be apparent from the embodiment of a centerless grinder according to the invention illustrated by way of example on the accompanying drawing in which:

Fig. 1 is a section, taken along the line 1—1 of Fig. 2, of the grinding machine; and Fig. 2 is a section taken along the line 2—2 in Fig. 1.

As illustrated, the spindle 1 of a grinding wheel 8 runs in two antifriction bearings 2 which are the main spindle bearings of the machine. Adjacent each main bearing 2 is a compensating bearing 3 tightly surrounded by a ring 4. Each of the rings 4 is radially loaded by two helical compression springs 5 placed symmetrically in relation to the point where the grinding wheel is contacted by a workpiece W placed upon a workpiece support 9 which is rigidly joined with the housing or frame structure 10 of the machine, The main bearings 2 are immovably seated in respective sleeve members 11 rigidly fixed in structure 10 to form part thereof. The rings 4 of the compensating bearings 3 have an outer diameter slightly smaller than the inner diameter of sleeve members 11 so as to leave a peripheral clearance.

The two springs 5 of each compensating bearing are spaced 120° from each other and are seated in respective cup-shaped housings 12 secured to the sleeve member 11. The springs jointly urge the spindle 1 in the direction of the arrow X in Fig. 2, i.e. away from the working piece W and against the main bearings 2. Each ring 4 is locked against rotation by means of a set screw 6. The spindle 1 is connected with the machine drive by a flexible clutch 7 of conventional type wihch permits the spindle 1 to move parallel to its axis to take up any wear occurring in its bearings.

It will be apparent to those skilled in the art, upon a study of this disclosure, that my invention permits of various modifications as regards details and particular application, and hence may be given embodiments other than particularly illustrated and described herein, without departing from the essential features of my invention and within the scope and claims annexed hereto.

I claim:

1. A machine tool comprising a machine frame structure, two coaxially aligned main bearings fixed to said structure, a tool spindle journalled in said main bearings, said structure approximately defining a machining point radially spaced from the axis of said spindle between said two main bearings, two compensating bearings in journalling engagement with said spindle at locations axially adjacent to said respective main bearings, said compensating bearings being radially displaceable relative to said structure, and two groups of spring means disposed between said structure and said respective compensating bearings, the spring means of each group being substantially symmetrical to the spindle radius through said machining point and having at said compensating bearing a resultant force directed on said radius away from said point.

2. A centerless grinding machine comprising a machine frame structure, two coaxially aligned main bearings fixed to said structure, a tool spindle journalled in said main bearings, a grinding tool member coaxially mounted on said spindle between said main bearings, two compensating bearings axially adjacent to said respective main bearings, said compensating bearings having radial clearance relative to said structure but being in running-fit engagement with said spindle, a fixed workpiece support radially in front of said tool member, and two groups of spring means each abutting against said frame structure on the one hand and against one of said respective compensating bearings on the other hand, the spring means of each group being disposed in substantially symmetrical relation to the spindle radius defined by said workpiece support and having at said compensating bearing a resultant force directed away from said support.

3. A centerless grinding machine comprising a machine frame structure, two coaxially aligned main bearings fixed to said structure, a tool spindle journalled in said main bearings, a grinding tool member coaxially mounted on said spindle between said main bearings, a fixed workpiece support radially in front of said tool member, two compensating bearings in journalling engagement with said spindle at locations axially adjacent to said respective main bearings, each of said compensating bearings being radially displaceable relative to said structure, and two pairs of springs disposed between said structure and said respective compensating bearings, the two springs of each pair being angularly spaced from each other about the spindle axis an amount of approximately 120° in substantially symmetrical relation to the radial plane defined by said workpiece support, said two springs of each pair having at said compensating bearing a resultant spring force directed away from said support.

4. A centerless grinding machine comprising a machine frame structure, two coaxially aligned main bearings fixed to said structure, a tool spindle journalled in said main bearings, a grinding tool member coaxially mounted on said spindle between said main bearings, a fixed workpiece support radially in front of said tool member, two compensating bearings in journalling engagement with said spindle at locations adjacent to said respective main bearings, each of said compensating bearings having a framing ring and having peripheral clearance between said ring and said structure, stop means between said structure and each of said respective rings for preventing rotation of said compensating bearings relative to said structure, said structure having two sleeve members surrounding said respective rings, each of said members forming two spring seats spaced 120° from each other and located between the spindle axis and said workpiece support, two helical compression springs mounted on said respective seats of each member and extending therefrom radially to said ring, said springs having relative to each compensating bearing a resultant force directed away from said support and toward said spindle.

References Cited in the file of this patent

UNITED STATES PATENTS

| | | |
|---|---|---|
| 1,162,125 | Bassett | Nov. 30, 1915 |
| 1,697,046 | Chapman et al. | Jan. 1, 1929 |
| 1,976,110 | Binns | Oct. 9, 1934 |
| 2,010,965 | Schrivener | Aug. 13, 1935 |
| 2,375,306 | Koplin et al. | May 8, 1945 |